(12) United States Patent
Dunn et al.

(10) Patent No.: US 7,441,963 B2
(45) Date of Patent: Oct. 28, 2008

(54) OPTICAL DEVICE

(75) Inventors: Mark Jeffrey Dunn, Ipswich (GB); Nicholas Turner, Ipswich (GB); David John Kenneth Meadowcroft, Stowmarket (GB); David Healy, Stowmarket (GB)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/477,223

(22) Filed: Jun. 29, 2006

(65) Prior Publication Data

US 2007/0147744 A1  Jun. 28, 2007

(30) Foreign Application Priority Data

Jul. 7, 2005 (GB) ................... 0513955.5

(51) Int. Cl.
*G02B 6/36* (2006.01)

(52) U.S. Cl. ...................................... 385/88
(58) Field of Classification Search ..................... 385/88
See application file for complete search history.

(56) References Cited

U.S. PATENT DOCUMENTS

| 4,383,731 | A | * | 5/1983 | Simon et al. ................... 385/92 |
|---|---|---|---|---|
| 4,658,130 | A | * | 4/1987 | Durbin ........................ 212/285 |
| 4,997,254 | A | * | 3/1991 | Ganev .......................... 385/90 |
| 5,065,011 | A | | 11/1991 | Fujihara et al. ......... 250/227.24 |
| 5,257,336 | A | * | 10/1993 | Dautartas ..................... 385/93 |
| 5,434,939 | A | * | 7/1995 | Matsuda ....................... 385/88 |
| 5,586,208 | A | * | 12/1996 | Nishiyama .................... 385/93 |
| 5,883,966 | A | | 3/1999 | Kubo ......................... 381/386 |
| 5,901,262 | A | * | 5/1999 | Kobayashi et al. ............. 385/89 |
| 6,942,396 | B2 | * | 9/2005 | Marion et al. ................. 385/90 |
| 7,198,411 | B2 | * | 4/2007 | Fujii et al. .................... 385/88 |
| 7,250,611 | B2 | * | 7/2007 | Aguirre et al. ........... 250/461.1 |
| 7,313,302 | B2 | * | 12/2007 | Fincato et al. ................. 385/43 |
| 2002/0197025 | A1 | | 12/2002 | Vaganov et al. ................ 385/92 |
| 2004/0008952 | A1 | * | 1/2004 | Kragl ........................... 385/88 |
| 2004/0252951 | A1 | | 12/2004 | Nagasaka et al. .............. 385/88 |
| 2005/0036732 | A1 | | 2/2005 | Kropp ........................ 385/16 |

FOREIGN PATENT DOCUMENTS

| GB | 2 026 235 | 1/1980 |
|---|---|---|
| GB | 2 127 989 | 4/1984 |
| GB | 2 321 531 | 7/1998 |

* cited by examiner

Primary Examiner—Ellen Kim

(57) ABSTRACT

An optical device has a photodiode placed on a substrate. A guide is formed on the substrate so that it surrounds the photodiode with concentric positioning to an accuracy better than 5 μm. A ferrule of a ferrule assembly engages within the guide for automatic alignment with the photodiode without need for active alignment with monitoring of light signals.

8 Claims, 5 Drawing Sheets

OPTICAL DEVICE

The invention relates to an optical device having an optical transmitter or receiver for coupling with a fibre optic.

At present, one of the major problems associated with such devices is that of accurately coupling a fibre termination with the transmitter or receiver.

The invention addresses this problem.

STATEMENTS OF INVENTION

According to the invention, there is provided an optical device comprising a substrate and an optical component, wherein the device further comprises a guide surrounding the component and being configured to align a fibre termination which is pushed towards the component.

In one embodiment, the guide is of generally annular shape.

In another embodiment, the guide has a frusto-conical internal surface configuration with a decreasing internal diameter towards the component.

In a further embodiment, the component is located within a recess in the substrate.

In one embodiment, the recess comprises a keyway feature for orientation of a fibre termination.

In another embodiment, further comprises an interconnect base surrounding the guide and being configured for engagement with a ferrule receptacle.

In a further embodiment, the device further comprises passive components surrounding the guide.

In another aspect the invention provides an optical device assembly comprising an optical device of any preceding claim and a fibre termination receptacle secured to the guide in optical alignment with the optical component.

DETAILED DESCRIPTION OF THE INVENTION

The invention will be more clearly understood from the following description of some embodiments thereof, given by way of example only with reference to the accompanying drawings in which:—

Figure 1:
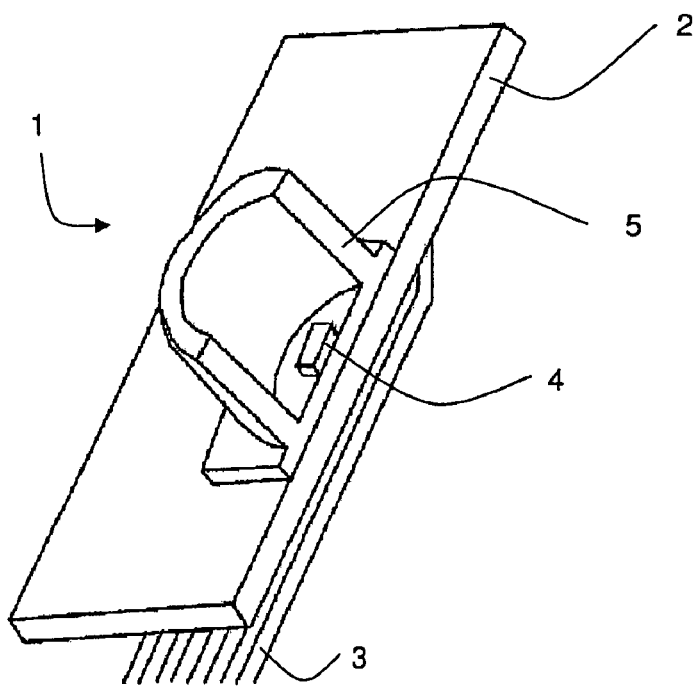
FIG. 1 is a perspective cut-away view of an optical device of the invention.

Referring to FIG. 1 an optical device 1 comprises a substrate 2 from which extends leads 3. A photodiode 4 is placed on the substrate 2, and it is surrounded by a sleeve-shaped guide 5. The guide 5 is annular in cross-section, having a centre aligned with the optical axis of the photodiode 4.

The guide 5 may be grown as a concentric feature on the substrate, of material such as polyamide. Alternatively, the guide may be a discrete item placed with high-accuracy equipment onto the substrate.

Figure 2:
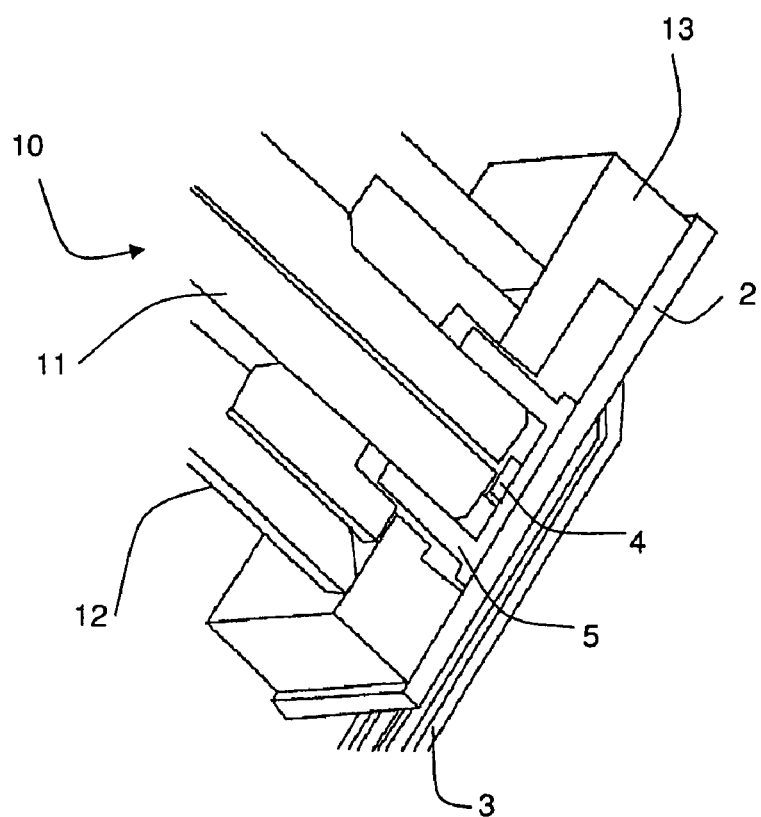
FIG. 2 is a detailed perspective view showing aligning of a fibre termination with a diode.
Figure 3:
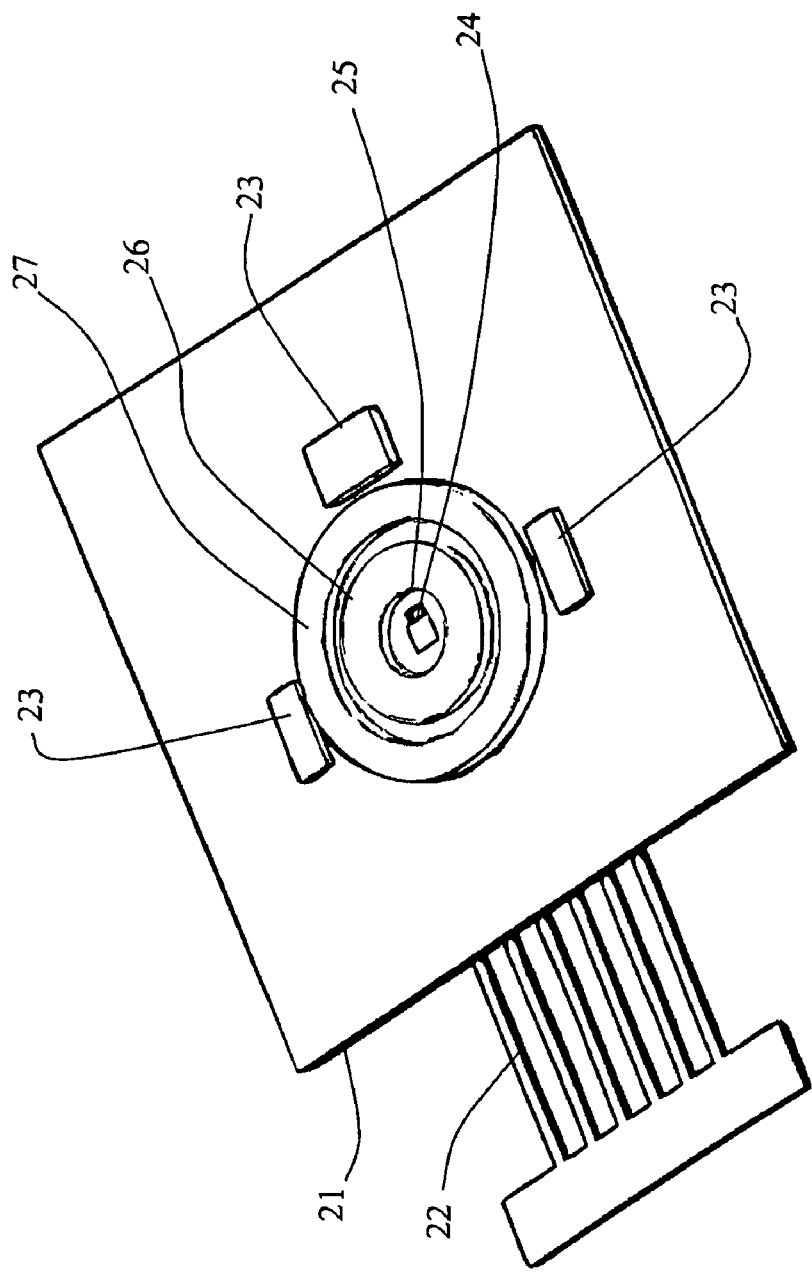
FIGS. 3 to 6 are a perspective view of an alternative optical device of the invention and showing an interconnection of a fibre termination receptacle.

Referring to FIG. 2 a ferrule assembly 10 comprising a ferrule 11 and a ferrule receiver 12 is secured by adhesive over the photodiode 4, with the photodiode 4 in optical alignment with the ferrule. To make the connection, it is a simple task of pushing the assembly 10 into place with the ferrule 11 sliding into the guide 5. Because of the accurate mutual positioning of the photodiode 4 and the guide 5 there is excellent optical coupling without need for an active alignment device which monitors optical signals in the fibre during placement. The receptacle 12 is secured in place by adhesive to the sleeve 5 and a surrounding base 13. The OD of the guide 5 and the ID of the base 13 are carefully matched for a good fit.

Securing of the ferrule assembly 10 in this manner to the substrate not only maintains good optical alignment without need for active alignment equipment, but it also provides a hermetic seal around the photodiode 4 and the end of the ferrule 11.

Referring to FIGS. 3 to 6 an optical device 20 comprises a substrate 21 and leads 22 forming a lead frame. A photodiode 24 is located in a recess 25 having a keyway feature for orientation of a ferrule. These are surrounded by an inner annular guide base 26, in turn surrounded by a concentric outer annular guide base 27.

The channel between the inner and outer guide bases 26 and 27 is a receiver for a fibre termination guide and the other surfaces of the guide bases 26 and 27 provide features for securing to the remainder of a guide.

The recess 25 may be precision cut, turned, or moulded to a tolerance of better than 0.5 µm. The inner guide base 26 is precision turned or moulded to be concentric with the recess 25 to better than 0.5 cm tolerance. The outer guide base 27 is in one embodiment of machined plastics material to a tolerance of better than 5 µm. If less precision is required, it may be injection moulded.

Figure 4:
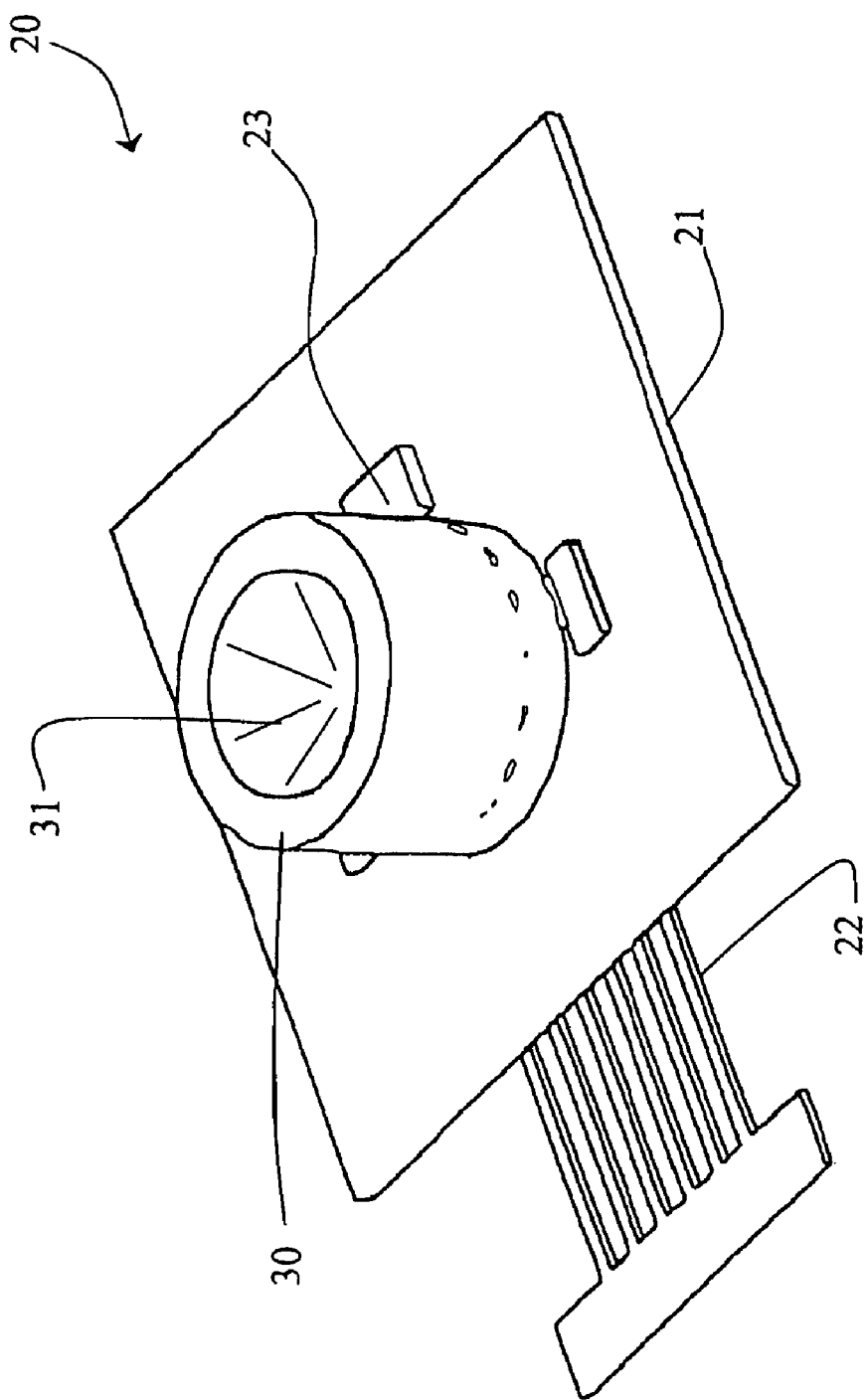

Referring to FIG. 4 the completed device 20 is shown, with a guide 30 having a frusto-conical internal surface 31 secured in place by engagement with the guide bases 26 and 27. The guide 30 is bonded in place with adhesive.

Figure 5:
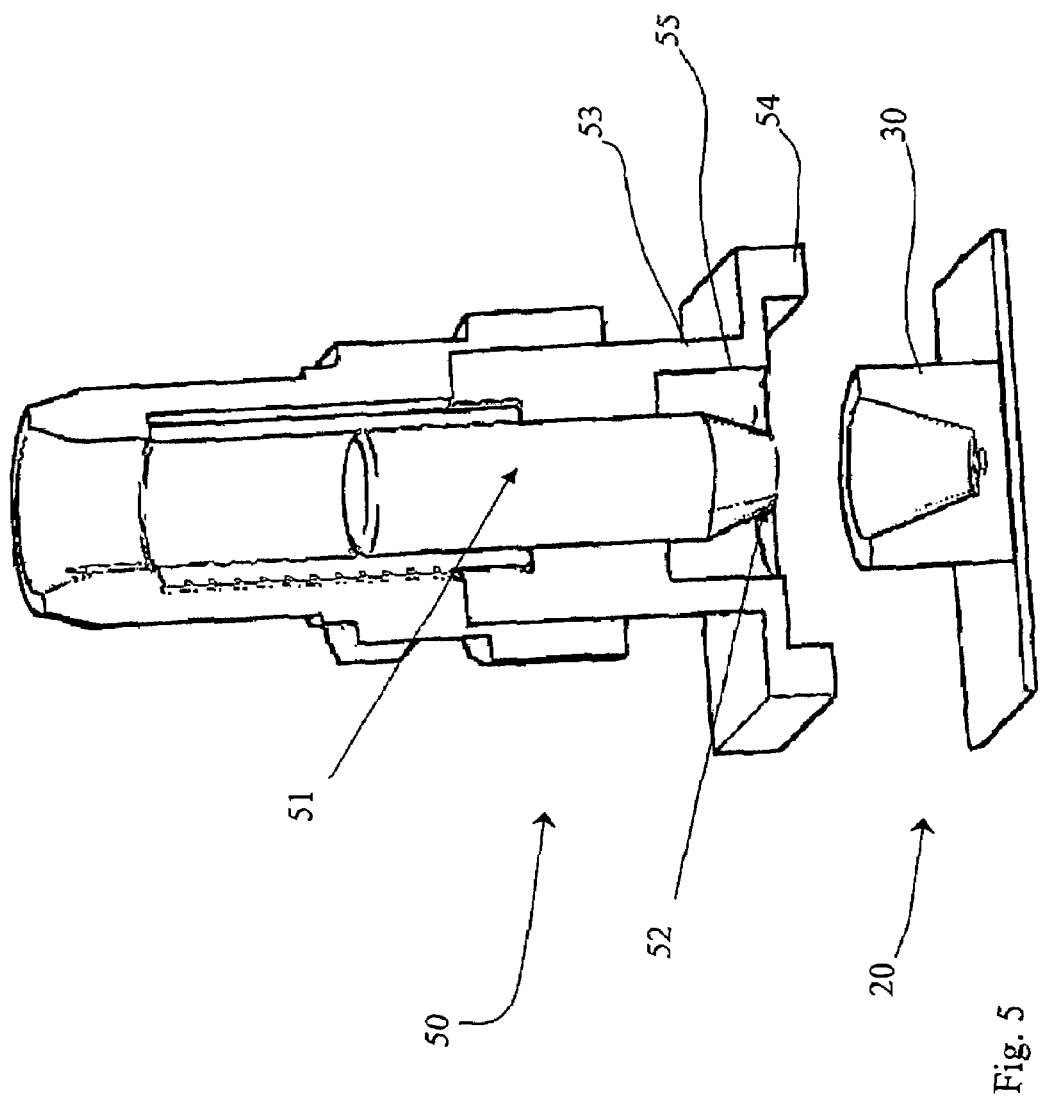
Figure 6:
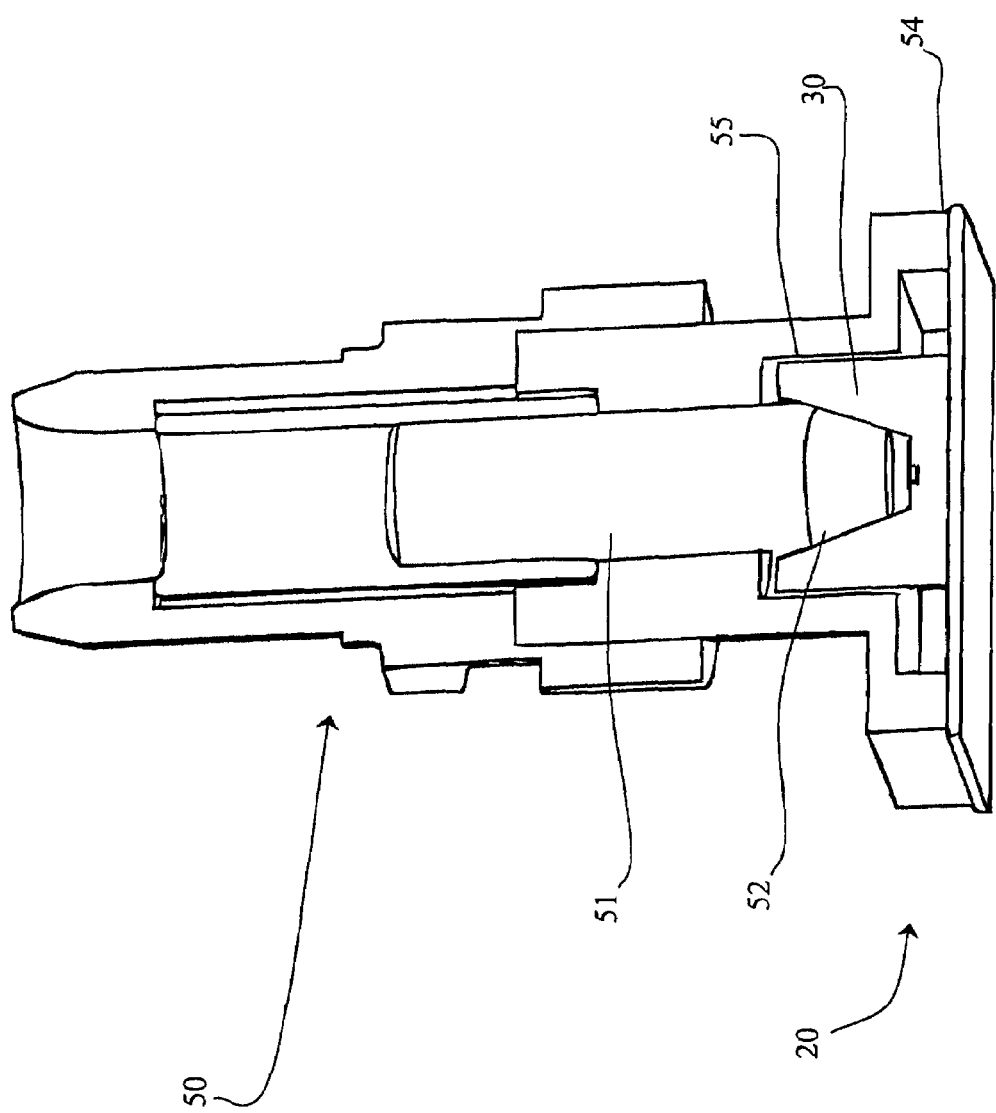

Referring to FIGS. 5 and 6 a ferrule assembly 50 is shown being secured to the device 30. The assembly 50 comprises a fibre stub 51 with a tapered end 52 housed within a receptacle 53 having a lower collar 54 and an inner recess 55. As shown in FIG. 6 the guide 30 engages within the recess 55 and the collar 54 is bonded to the substrate 21 surrounding the guide 30. It will be appreciated that the tapered configuration of the end of the fibre termination at 52 and the corresponding tapered internal surface of the guide 30 allow an excellent alignment for optical coupling. Again, it is only a matter of presenting the assembly 50 to the device 20 and the tapered surfaces and location of the guide 30 allow excellent alignment without need for active alignment monitoring. Again, the end of the fibre termination and the photodiode are in a sealed environment The invention is not limited to the embodiments described but may be varied in construction and detail. For example, the channel between the guide bases 26 and 27 may be the locating feature for the device—the ferrule assembly incorporating the guide 30.

The invention claimed is:

1. An optical device comprising a substantially planar lead-carrying substrate and an optical component mounted on the substrate, wherein the device further comprises a fibre guide surrounding the component and being configured to align a fibre termination retained within a ferrule assembly which is pushed into the fibre guide toward the component in a direction perpendicular to the substantially planar lead-carrying substrate, and wherein the fibre guide has a frusto-conical internal surface configuration with a decreasing internal diameter towards the component, the decreasing internal diameter corresponding to a frusto-conically tapered shape of the fibre termination.

2. An optical device as claimed in claim 1, wherein the guide is of generally annular shape.

3. An optical device as claimed in claim 1, wherein the component is located within a recess in the substrate.

4. An optical device as claimed in claim 3, wherein the recess comprises a keyway feature for orientation of a fibre termination.

5. An optical device as claimed in claim 1, further comprising an interconnect base surrounding the guide and being configured for engagement with a ferrule receptacle.

6. An optical device as claimed in claim 5, wherein the device further comprises passive components surrounding the guide.

7. An optical device assembly comprising: an optical device comprising a substantially planar lead-carrying substrate and an optical component mounted on the substrate, wherein the device further comprises a fibre guide surrounding the component and being configured to align a fibre termination secured within a ferrule assembly which is pushed into the fibre guide toward the component in a direction perpendicular to the substantially planar lead-carrying substrate, and wherein the fibre guide has a frusto-conical internal surface configuration with a decreasing internal diameter towards the component, the decreasing internal diameter corresponding to a frusto-conically tapered shape of the fibre termination; and a fibre termination receptacle secured to the guide in optical alignment with the optical component.

8. A method for connecting an optical fibre to an optical assembly, the optical fiber retained within a ferrule assembly and having a frusto-conical tip, the optical assembly comprising a substantially planar lead-carrying substrate, an optical component mounted on the substrate, a fibre guide surrounding the component, and a receptacle attached to the guide, the guide having a frusto-conical internal surface, the method comprising:

plugging the ferrule assembly into the optical assembly until:

the frusto-conical tip of the optical fibre retained within the ferrule assembly mates with the frusto-conical internal surface of the fibre guide; and a portion of the ferrule assembly mates with a mating portion of the receptacle.

* * * * *